July 30, 1929.  A. L. KNAPP  1,722,331
MOTOR VEHICLE
Filed Dec. 5, 1925
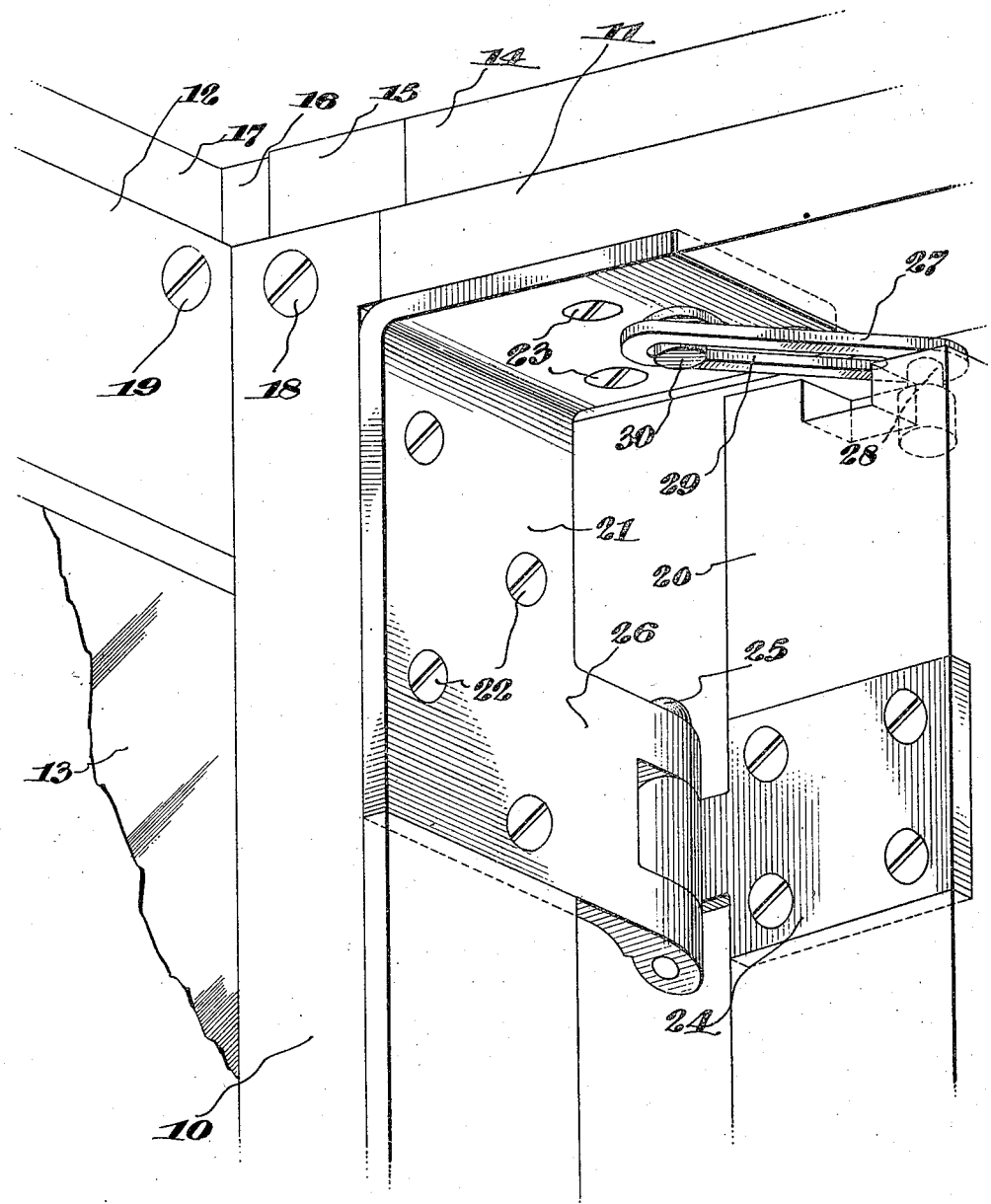
Inventor
Archer L. Knapp
By
Attorney Patented July 30, 1929.

1,722,331

UNITED STATES PATENT OFFICE.

ARCHER L. KNAPP, OF DETROIT, MICHIGAN, ASSIGNOR TO PACKARD MOTOR CAR COMPANY, OF DETROIT, MICHIGAN, A CORPORATION OF MICHIGAN.

MOTOR VEHICLE.

Application filed December 5, 1925. Serial No. 73,306.

This invention relates to motor vehicles and particularly to the body construction thereof.

One of the objects of the invention is to simplify and strengthen the body construction of a motor vehicle.

Another object of the invention is to provide a connection between the door frame and door of a motor vehicle body so that the limit strap of the door will have a direct connection to the metal part to which the door hinge itself is connected to thereby remove strains from the wood frame of the body.

Another object of the invention is to prevent undue twisting strains on the body frame at the point where the door is connected to the frame.

Other objects of the invention will appear from the following description taken in connection with the drawing, which forms a part of this specification, and in which:

The figure is a perspective view of a portion of a body frame and door connection embodying the invention.

Referring to the drawing, 10 indicates a vertical portion of the door frame of a vehicle body, this being what is sometimes termed one of the door jambs. A horizontal portion of the door frame is indicated at 11, this being the top member of the frame or that member which extends across the top of the door opening. At the left of the view is shown a horizontal member 12 which preferably extends across the front of the vehicle body at the top thereof, and a windshield 13 may be arranged just below this member 12 and just in front of the vertical member 10.

Other portions of the body are indicated at 14, 15, 16 and 17, and these parts are suitably connected to the members 10, 11 and 12 and the various members are also suitably connected together, some of the screws for such connections being illustrated at 18 and 19.

The vehicle door is shown at 20. This door is adapted to close the doorway formed at one side by the vertical member 10 and at the top by the horizontal member 11.

A bracket is indicated at 21, which bracket is shown in the form of an angle iron and is preferably a drop forging or other metal piece. This bracket or angle iron 21 is secured in the corner formed by the portions 10 and 11 of the door frame and it is secured to those parts as by the various screws 22 and 23, the screws 22 into the portion 10 and the screws 23 into the portion 11 of the door frame. This bracket forms a reinforcing member for the door frame pieces and holds these pieces in their relative positions.

The door 20 has a hinge member 24 which connects by a hinge pin 25 with a hinge member 26 which is formed as an integral part or extension of the vertical portion of the bracket or angle iron 21. Thus there is a hinge connection between the door and that part of the angle iron 21 which is connected to the door frame portion 10.

At the top of the door there is a limit strap 27 which is shown as pivotally connected to the door at 28 and as having a slot 29 in which a pin 30 is arranged to slide. The pin 30 is mounted in and extends downwardly from the horizontal portion of the angle iron 21, or that portion of said angle iron that is secured to the horizontal portion 11 of the door frame. Thus is formed a limit strap connection between the top of the door and the horizontal portion of the angle iron.

By this arrangement the door is hinged to a metal member on the door frame which is connected to both the vertical and horizontal members of the frame, and the door is also connected to this same metal member by a limit strap. Thus the door frame is protected from undue twisting action, as when the door is swung open wide and the limit strap stops it with a jerk. The reaction of this movement of the door is resisted within the angle iron 21, both parts of the door, the hinge and the limit strap being connected to this rigid bracket 21.

While I have herein described in some detail a specific embodiment of my invention, which I deem to be new and advantageous and may specifically claim, I do not desire it to be understood that my invention is limited to the exact details of the construction, as it will be apparent that changes may be made therein without departing from the spirit or scope of my invention.

Having thus described my invention, what I claim and desire to secure by Letters Patent is:

1. In a motor vehicle, the combination with a door casing and a door, of a hinge including an angle member positioned on the inside of a corner of said casing, a plate member attached to said door and pivoted to said angle member, a stop member pivotally attached to the top of said door and a pin in the upper face of said angle member engaging said stop, whereby when said door is closed said stop and hinge are substantially concealed.

2. In combination, a door casing and door therefor, a hinge including an angle-iron positioned on an inside corner of said casing and adapted to reenforce said casing, a plate positioned on a vertical edge of said door, said plate being pivoted to said angle-iron and being adapted to lie flat on the vertical face of said angle-iron when said door is closed, a member cooperating with the angle-iron and the door for limiting the opening movement of the door.

In testimony whereof I affix my signature.

ARCHER L. KNAPP.